United States Patent [19]
Suzuki

[11] Patent Number: 5,375,461
[45] Date of Patent: Dec. 27, 1994

[54] CONTROL SYSTEM FOR CHASSIS DYNAMOMETER FOR SIMULATING ROAD TEST OF AUTOMOTIVE VEHICLE

[75] Inventor: Yorikatsu Suzuki, Kanagawa, Japan

[73] Assignee: Kabushiki Kaisha Meidensha, Tokyo, Japan

[21] Appl. No.: 720,010

[22] Filed: Jun. 24, 1991

[51] Int. Cl.$^5$ .............................................. G01L 5/13
[52] U.S. Cl. ..................................................... 73/117
[58] Field of Search ...................... 73/117, 116, 117.2, 73/117.3, 865.6

[56] References Cited

U.S. PATENT DOCUMENTS

| | | | |
|---|---|---|---|
| 3,520,180 | 7/1970 | Polhemus et al. | 73/117 |
| 3,952,589 | 4/1976 | Geul | 73/117 |
| 4,327,578 | 5/1982 | D'Angelo | 73/117 |
| 4,520,444 | 5/1985 | Koos | 73/117 |
| 4,635,472 | 1/1987 | Scourtes | 73/117 |
| 4,656,576 | 4/1987 | Kawarabayashi | 364/148 |
| 4,825,690 | 5/1989 | Mears | 73/117 |
| 5,036,700 | 8/1991 | Knestel | 73/117 |
| 5,063,773 | 11/1991 | Fujimori et al. | 73/117 |

FOREIGN PATENT DOCUMENTS

| | | |
|---|---|---|
| 754189 | 12/1970 | Belgium . |
| 61-734 | 1/1986 | Japan . |
| 62-25233 | 2/1987 | Japan . |
| 62-197741 | 9/1987 | Japan . |
| 63-55433 | 3/1988 | Japan . |
| 63-117236 | 5/1988 | Japan . |
| 246891 | 10/1990 | Japan . |
| 2065887 | 7/1981 | United Kingdom . |

Primary Examiner—Hezron E. Williams
Assistant Examiner—George Dombroske
Attorney, Agent, or Firm—Bachman & LaPointe

[57] ABSTRACT

A control system for a chassis dynamometer for bench testing vehicular performance, comprises at least one roller rotatably coupled with a vehicular wheel said roller to be driven by driving torque transmitted from said vehicular wheel therefrom, at least one dynamometer coupled with the roller to be driven by driving torque transmitted through the roller, a first monitor for monitoring preselected control parameters for providing first chassis dynamometer control data, a second monitor for monitoring rotary components in a system associated with the dynamometer including the dynamometer per se, for providing second chassis dynamometer control data, and a control signal generator for receiving the first and second chassis dynamometer control parameters for deriving a dynamometer control signal generating a control signal to said dynamometer for providing a rolling resistance to said vehicular wheel at said roller simulating a predetermined vehicular driving condition.

7 Claims, 4 Drawing Sheets

CONTROL SYSTEM FOR CHASSIS DYNAMOMETER FOR SIMULATING ROAD TEST OF AUTOMOTIVE VEHICLE

BACKGROUND OF THE INVENTION

1. Field of the Invention

The present invention relates generally to a chassis dynamometer for performing a bench test of performance of an automotive vehicle. More specifically, the invention relates to a control system for a chassis dynamometer which is particularly applicable for a road test simulating bench test for a four wheel drive type automotive vehicle.

2. Description of the Background Art

Japanese Patent First (Unexamined) Publication (Tokkai) Showa 63-55433 discloses a chassis dynamometer for a four wheel drive type automotive vehicle. The disclosed chassis dynamometer employs rollers for four respective vehicular wheels, a power absorber device and a mechanical inertia device. Clutches are provided for connecting left and right rollers for synchronizing two front rollers and two rear rollers respectively by engagement of clutches. Namely, the chassis dynamometer disclosed in the above-identified publication is operable in two distinct modes. When the clutches are disconnected, the left and right wheels operates independently of each other for independent operation of the four respective rollers. When the clutches are engaged, synchronous operation between respective left and right rollers is achieved. In such case, front and rear pairs of rollers are operative independently of each other. In the disclosed system, distribution of the driving torque for respective rollers is controlled as a function of acceleration of the overall unit of the chassis dynamometer. In derivation of a torque different between front and rear rollers, specific inertia, i.e. mechanical inertia, of front and rear wheels is not taken into consideration.

A similar type of chassis dynamometer has been proposed in Japanese Patent First (Unexamined) Publication (Tokkai) shows 61-734 and Japanese Patent First (Unexamined) Publication (Tokkai) Heisei 2-46891. In the latter two publications, a component of mechanical inertia is not taken into account. Since a vehicle is always subject to mechanical inertia, failure to monitor mechanical inertia may cause test accuracy to be degraded. In other words, the systems set forth above cannot precisely simulate a road test because distribution of driving torque to respective rollers may be differentiated from actual road test data due to lack of the mechanical inertia factor.

On the other hand, in order to simulate behavior of the four wheel vehicle, it becomes necessary to simulate load distribution between front and rear axles. That is, during actual driving of the vehicle, the vehicular attitude can be changed by shifting of the center of gravity affected by inertia moment. Typical attitude change are known as winding up or squatting and nose diving, which are caused by axial shifting of the center of gravity. Conventionally, such vehicular attitude changes have not been possible to simulate. The aforementioned Japanese Patent First Publication Showa 63-55433 provides a certain gain in simulating vehicular pitching motion by providing the capability of operating the front rollers and rear rollers independently of each other. However, even by utilizing such a chassis dynamometer, it has not yet been possible to successfully simulate nose diving caused by an inertial moment of a vehicular body.

On the other hand, in modern automotive technologies, it has been becoming important to simulate vehicular body attitude change for testing performance of an attitude control system to be installed in the vehicle. For instance, capability of simulating nose diving will permit testing and evaluation of performance of the anti-skid brake control systems. In the current technology, nose dives may be simulated by providing a load distribution control system for the vehicle or otherwise by utilizing special arrangements of a chassis dynamometer which is specifically designed for simulating nose dives.

There are two types of four wheel drive power train arrangements to be employed in the vehicle. One of those is a full-time four wheel drive power train layout, in which driving torque generated by an automotive engine is always distributed to all four wheels. The other is a part-time four wheel drive power train layout, in which the power train normally operates as a two wheel drive power train, and switches to four wheel drive under predetermined conditions, such as excessive wheel slippage of the primary drive wheels. In case of the part-time four wheel power train layout, since the vehicle is normally driven by a two wheel drive power train layout, simulation is substantially the same as that for a two wheel drive vehicle. Also, even when the part-time four wheel power train is switched into four wheel mode due to excessive wheel slippage at the primary driving wheels, since the wheel slippage may easily be caused even in the four wheel drive mode power train layout both on the primary and auxiliary driving wheels, the simulation will not be significantly different from conventional two wheel drive vehicles. However, on the other hand, in the modern full-time four wheel power train layout, distribution of driving torque is variable depending upon vehicular driving conditions. Typically, torque distribution is adjusted in proportion to acceleration and deceleration. When bench testing is to be performed on a chassis dynamometer for such a vehicle having a variable torque split full-time four wheel drive power train layout, for simulating straight acceleration and deceleration on a smooth road, wheel speeds at front and rear wheels will become different. At the same time, the rotation speed of the roller as an imaginary road surface is required to be equal for all rollers. Particularly for performing a 10 mode test or an LA-4 mode test for testing fuel consumption and exhaust gas composition, uniformity of roller speed becomes essential for providing satisfactory testing accuracy.

Namely, in case of a four wheel drive vehicle having a passive differential mechanism, such as a center differential gear unit, wheel speed at the front and rear wheels should be different because ground speed at all wheels are equal to each other. Naturally, increasing of the wheel speed difference between the front and rear wheels may increase internal loss of driving torque in the center differential gear unit and may influence exhaust gas composition and fuel consumption. On a chassis dynamometer, there also exists wheel slippage characteristics similar to those occurring on an actual road surface. Therefore, it is considered that, by adjusting the peripheral speed, that is, the rotational speed of the outer surfaces of the rollers to be consistent with each other, torque distribution similar to that on an actual road can be simulated.

In an actual road test, overall driving torque at four wheels can be expressed by the following equation:

$$F = A + Bv^2 + Mg \times (dv/dt) + Mg\sin\theta \qquad (1)$$

wherein
F: vehicular driving force; in case of four wheel drive vehicle, total driving force of driving forces at respective of four wheels;
A: rolling resistance of the wheel;
B: coefficient of air resistance;
v: vehicular speed (m/sec.)
M: vehicular inertia weight (kg)
g: gravitational acceleration; and
$\theta$: inclination angle of the road surface in the longitudinal direction.

Normally, if the testing is performed simulating a flat road, the element (mgsin $\theta$) can be neglected. The element (A) and element (Bv$^2$) are absorbed by the dynamometer or by a power absorbing device. On the other hand, the element (mg(dv/dt)) is absorbed by a mechanical inertia control device, such as a flywheel or electrical inertia control means as disclosed in the above-identified publications. Especially, as illustrated in the aforementioned publication, electrical inertia control means is frequently employed. This is because the mechanical inertia of the roller and power absorbing device becomes approximately double that of a two wheel drive vehicle. For instance, in case of a chassis dynamometer having rollers of 1591 mm in diameter, the mechanical inertia of the roller and a power absorbing device will be in a range of 400 kg to 500 kg in case of a two wheel drive vehicle and in a range of 800 kg to 1000 kg in the case of a four wheel drive vehicle. Since the overall weight of a general small size vehicle is in a range of 800 kg to 1300 kg, it is almost equal to the mechanical inertia of the mechanical inertia absorbing device. Since the mechanical inertia in the electrical inertia absorbing means has much smaller mechanical inertia, the electric inertia absorbing means are advantageously employed.

On the other hand, concerning a composite ratio of traveling resistance, the elements (A) and (Bv$^2$) which are called as constant speed traveling resistance will not exceed 500N at vehicle speeds lower than or equal to 80 km/h. On the other hand, the traveling resistance of the element (Mg(dv/dt) at accelerating state in a magnitude of 0.1 g and at 1000 kg of the overall vehicular weight, becomes approximately 980N and therefore greater than that of the constant speed traveling resistance.

Accordingly, in such testing including testing for acceleration and deceleration, the technologies disclosed in the aforementioned publications are applicable only for a 50:50 torque split ratio. For this reason, the speed difference control disclosed in the aforementioned Japanese Patent First Publication Showa 63-55433, becomes substantially low in response for the vehicle having torque split ratio far different from even distribution (50:50).

SUMMARY OF THE INVENTION

Therefore, it is an object of the present invention to provide a chassis dynamometer control system which can provide enhanced road test simulating performance with satisfactorily high response characteristics.

According to one aspect of the invention, a control system for a chassis dynamometer for bench testing vehicular performance, comprises:
at least one roller rotatably coupled with a vehicular wheel, said roller to be driven by driving torque transmitted from said vehicular wheel;
at least one dynamometer coupled with the roller to be driven by driving torque transmitted through the roller;
first monitoring means for monitoring preselected control parameters for providing first chassis dynamometer control data;
second monitoring means for monitoring rotary components in a system associated with the dynamometer including the dynamometer per se, for providing second chassis dynamometer control data;
control signal generator means for receiving the first and second chassis dynamometer control parameters for deriving a dynamometer control signal for generating a control signal to said dynamometer providing a rolling resistance to said vehicular wheel at said roller simulating a predetermined vehicular driving condition.

According to another aspect of the invention, control system for a chassis dynamometer for bench testing vehicular performance, comprises:
at least first and second rollers rotatably coupled with first and second vehicular wheels oriented at axially different position on a vehicular body, said rollers being driven by driving torque transmitted from said vehicular wheels;
at least first and second dynamometers respectively coupled with the first and second rollers to be driven by driving torque transmitted through an associated one of said first and second rollers;
first monitoring means for monitoring preselected control parameters associated with the first roller, for providing first chassis dynamometer control data;
second monitoring means for monitoring preselected control parameters associated with the second roller, for providing second chassis dynamometer control data;
third monitoring means for monitoring rotary components in a system associated with the first dynamometer including the first dynamometer per se, for providing third chassis dynamometer control data;
fourth monitoring means for monitoring inertial force of rotary components in a system associated with the second dynamometer including the second dynamometer per se, for providing fourth chassis dynamometer control data;
control signal generator means for receiving the first and third chassis dynamometer control data for deriving a first dynamometer control signal for generating a control signal to said first dynamometer providing a rolling resistance to said vehicular wheels of said first roller simulating predetermined vehicular driving condition and for receiving the second and fourth chassis dynamometer control data for deriving a second dynamometer control signal for generating a control signal to said second dynamometer providing a rolling resistance to said vehicular wheels at said second roller simulating predetermined vehicular driving condition.

Each of the first and second monitoring means monitors peripheral speed of an associated one of the first and second rollers and the driving torque exerted on an associated one of the first and second dynamometers.

The chassis dynamometer control system may further comprise a first roller acceleration deriving means receiving the speed data of the first roller for deriving acceleration on the first roller on the basis thereof to produce first roller acceleration indicative data, the third monitoring means deriving the third chassis dynamometer control data based on a preset value representative of a sum value of an inertial force of the rotary components associated with the first dynamometer and the first roller acceleration indicative data; and a second roller acceleration deriving means receiving the speed data of the second roller for deriving acceleration on the second roller on the basis thereof to produce second roller acceleration indicative data, the fourth monitoring means deriving the third chassis dynamometer control data based on a preset value representative of a sum value of an inertial force of the rotary components associated with the second dynamometer and the second roller acceleration indicative data. In such case, the preset value of each of the third and fourth monitoring means may be variable depending upon a desired driving condition to be simulated by an associated one of the first and second dynamometers.

In the preferred construction, the chassis dynamometer control system may further comprise coupling means disposed between the first and second rollers for coupling and decoupling the first and second rollers, each of the third and fourth monitoring means varying the present value depending upon an operational position of the coupling means. Also, the chassis dynamometer control system may further comprise a speed difference setting means for setting a desired speed difference between the first and second rollers so that the control signal generator means generates the first and second chassis dynamometer control signals for achieving the set speed difference between the first and second rollers. In this case, the speed difference setting means may receive the speed data of the first and second rollers from the first and second monitoring means and derives a correction value based on a difference in the speeds of the first and second rollers and the desired speed difference and the control signal generator means modifies the first and second chassis dynamometer control signals with the correction value for achieving the desired speed difference.

According to a further aspect of the invention, a control system for a chassis dynamometer for simulating driving conditions for a vehicle having a four wheel drive power train in which driving torque generated by a prime mover of the vehicle is distributed to four wheels according to a controlled torque distribution ratio, the vehicle including at least a primary driving wheel and an auxiliary driving wheel, comprises:

a first roller rotatably coupled with the primary driving wheel to be driven by driving torque transmitted therefrom;

a second roller rotatably coupled with the auxiliary driving wheel to be driven by driving torque transmitted therefrom;

at least first and second dynamometers respectively coupled with the first and second rollers to be driven by driving torque transmitted through an associated one of said first and second rollers;

first monitoring means for monitoring preselected control parameters associated with the first roller, for providing first chassis dynamometer control data;

second monitoring means for monitoring preselected control parameters associated with the second roller, for providing second chassis dynamometer control data;

third monitoring means for monitoring inertial force of rotary components in a system associated with the first dynamometer, including the first dynamometer per se, for providing third chassis dynamometer control data;

fourth monitoring means for monitoring inertial force of rotary components in a system associated with the second dynamometer including the second dynamometer per se, for providing fourth chassis dynamometer control data;

control signal generator means for receiving the first and third chassis dynamometer control data for deriving a first dynamometer control signal for generating a signal to said first dynamometer providing rolling resistance to said vehicular wheel associated with said first roller simulating predetermined vehicular driving condition and for receiving the second and fourth chassis dynamometer control data for deriving a second dynamometer control signal for generating a signal to said second dynamometer providing rolling resistance to said vehicular wheel associated with said second roller simulating a predetermined vehicular driving condition.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments but are for explanation and understanding only.

In the drawings.

DESCRIPTION OF THE PREFERRED EMBODIMENT

Figure 1:
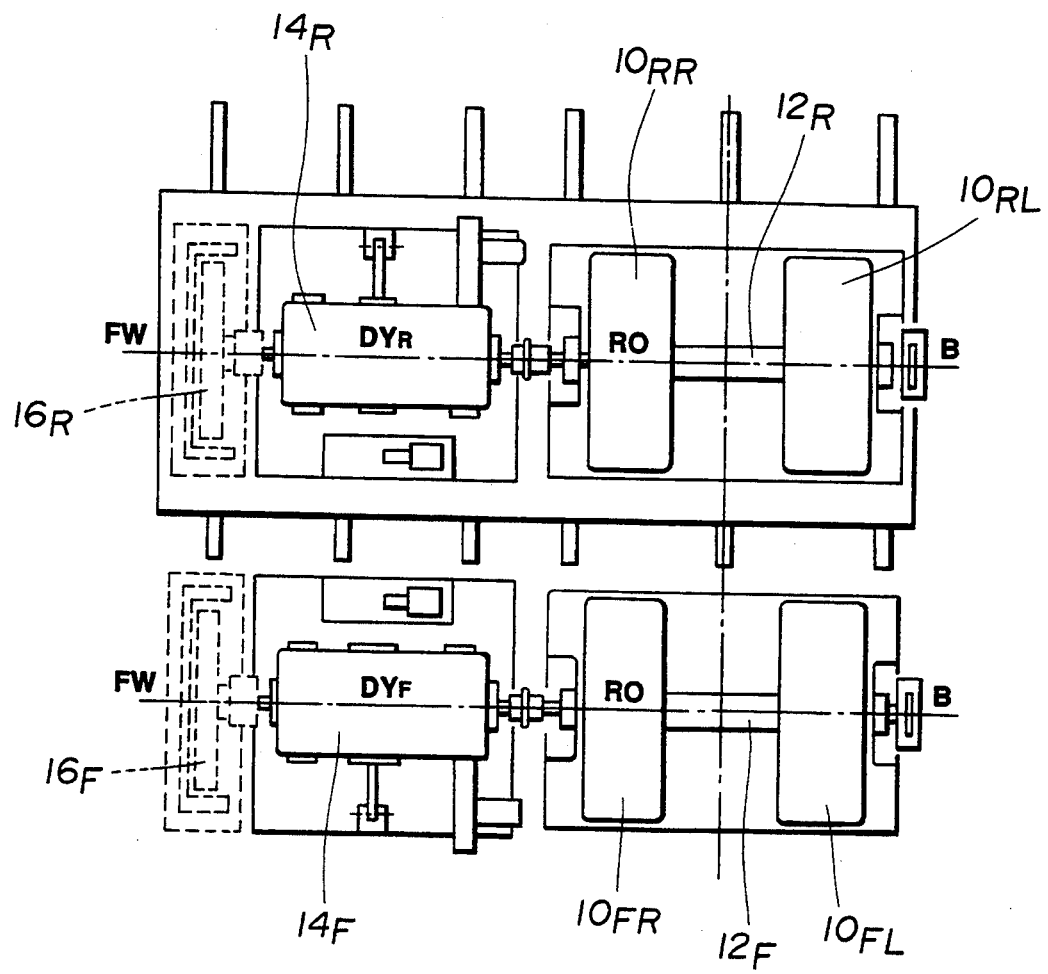
FIG. 1 is a plan view of the preferred embodiment of a chassis dynamometer, in accordance with the present invention.

Referring now to the drawings, particularly to FIG. 1, the preferred embodiment of a chassis dynamometer includes four rollers 10FL, 10FR, 10RL and 10RR for respectively receiving front-left, front-right, rear-left and rear-right wheels (not shown) of a vehicle (not shown). Respective rollers 10FL, 10FR, 10RL and 10RR will be occasionally referred as "front-left roller", "front-right roller" "rear-left roller" and "rear-right roller" and will be generally referred to as "rollers 10". The front-left and front-right rollers 10FL and 10FR are rotatably supported on a common rotary shaft 12F. Similarly, the rear-left and rear-right rollers 10RL and 10RR are rotatably supported on a common rotary shaft 12R. The front rotary shaft 12F is connected to a dynamometer 14F which is designed for absorbing driving torque transmitted from front wheels of vehicle to the rotary shaft 12F via the front-left and front-right rollers 10FL and 10FR. Similarly, the rear rotary shaft 12R is connected to a dynamometer 14R which also absorbs driving torque transmitted from rear wheels of the vehicle to the rotary shaft 12R via the rear-left and rear-right rollers 10RL and 10RR.

In order to simulate mechanical inertia, fly wheels 16F and 16R may be provided in cooperation with the dynamometers 14F and 14R. The arrangement of flywheels may not be specified to the shown arrangement and can be of any desired arrangements. For example, although the shown embodiment employs front and rear flywheels 16F and 16R respectively for front and rear rotary shafts 12F and 12R, either one of or both of the flywheels can be omitted if desirable. On the other hand, if necessary, a plurality of flywheels can be provided for each of the front and rear wheels. In addition, although it is not shown in the drawings, the preferred embodiment of the chassis dynamometer according to the invention may further employ a speed equalizer for mechanically coupling the front and rear rotary components for synchronous driving thereof. A clutch may also be employed between the speed equalizer and the roller for coupling and decoupling the speed equalized with the rollers.

Figure 2:
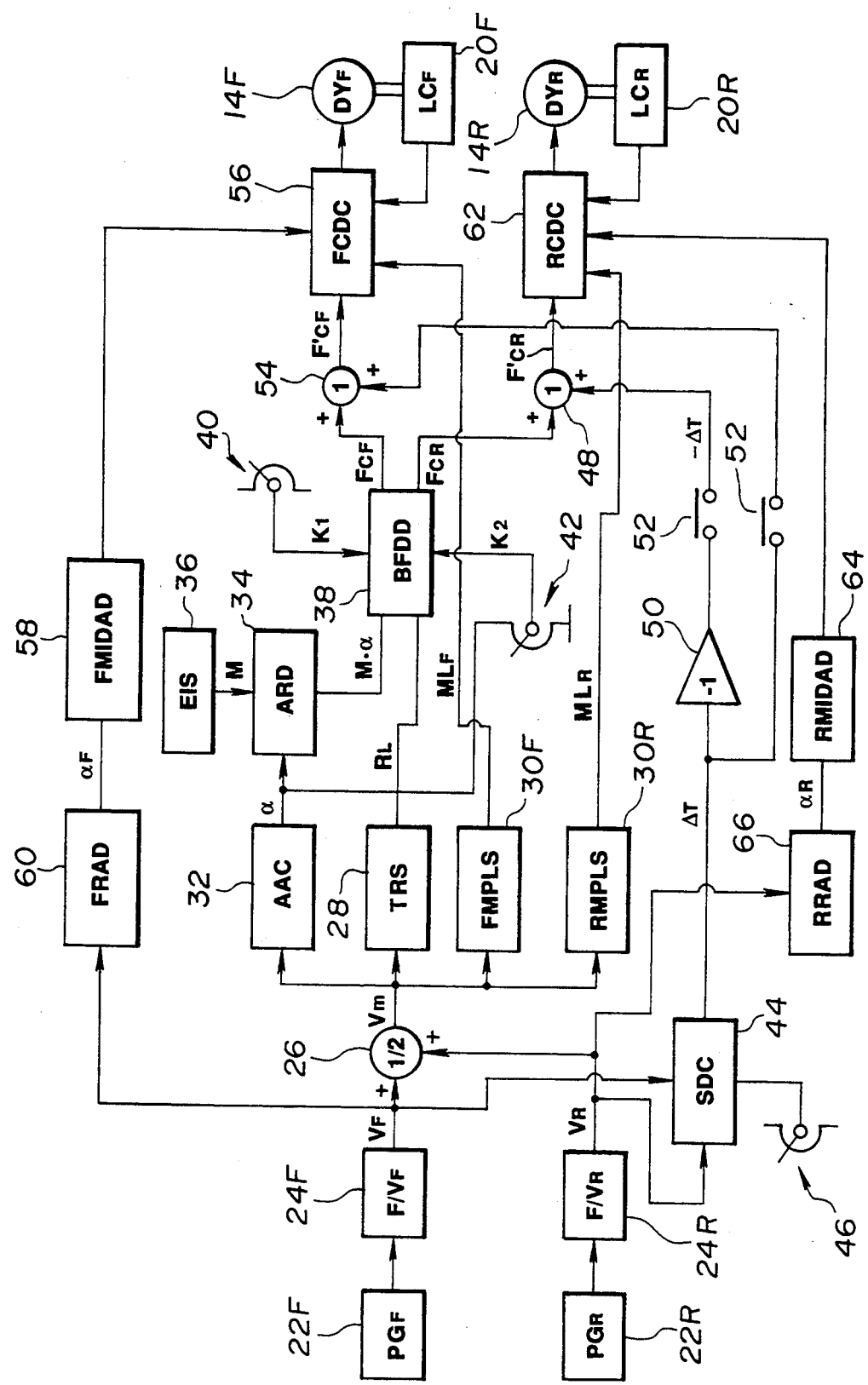
FIG. 2 is a block diagram of the preferred embodiment of a control system for controlling operation of the chassis dynamometer of FIG. 1.

FIG. 2 shows the preferred embodiment of the chassis dynamometer according to the present invention in discrete manner. As can be easily appreciated, whole or part of the shown system may be implemented by a digital computer system.

As can be seen from FIG. 2, the shown embodiment of the chassis dynamometer control system employs the front and rear dynamometers (DyF, Dyr) 14F and 14R. Each of the dynamometers 14F and 14R incorporates load cells (LCF, LCR) 20F and 20R for detecting torque and speed detectors (PGF, PGR) 22F and 22R for monitoring speed. Typically, the speed detectors 22F and 22R are mounted on the rollers 10 for directly monitoring the rotation speed thereof. The dynamometers 14F and 14R are designed to be controlled independently of each other. According to the principle of the invention, it should be clearly noted that the shown embodiment of the chassis dynamometer control system does not control the braking force to be generated by the dynamometer per se, as is performed in prior art systems, but controls overall braking force including generation of positive and negative torque acting on the rollers 10FL, 10FR, 10RL and 10RR.

The speed detectors 22F and 22R typically comprise pulse generators, such as rotary encoders for generating a pulse signal having a frequency proportional to the rotation speed of the associated rollers. In case where the control system is frequency-to-voltage (F/V) converters (F/VF, F/VR) 24F and 24R are provided for performing F/V conversion to produce voltage signals having a voltage level proportional to the frequency of the pulse signal output from the speed detectors 22F and 22R. As can be naturally appreciated, the F/V converters 24F and 24R are not necessary in a case where the control system is a digital system. Therefore, provision of the F/V converters is not essential to the control system.

In either case, front roller speed indicative signal VF and a rear roller speed indicative signal VF are fed to an adder 26. The adder 26 sums the front roller speed indicative signal VF and the rear roller speed indicative signal VR and divides the sum value by 2 for obtaining an average speed data. This average speed data serves as an average vehicle speed indicative data Vm. The vehicle speed indicative data Vm is fed to a traveling resistance setting circuit (TRS) 28, a front mechanical power loss setting circuit (FMPLS) 30F and a rear mechanical power loss setting circuit (RMPLS) 30R. The traveling resistance setting circuit 28 establishes a steady state traveling resistance RL. The front mechanical power loss setting circuit 30F derives a mechanical power loss on the front-left and front-right rollers 10FL and 10FR to provide a front mechanical power loss indicative data MLF. Similarly, the rear mechanical power loss setting circuit 30R derives a mechanical power loss at the rear-left and rear-right rollers 10RL and 10RR to provide a rear mechanical power loss indicative data MLR. The manner of deriving such steady state traveling resistance data RL and the front and rear mechanical power loss indicative data MLF and MLR are well known in the art, and therefore need not be discussed in further detail. The mechanical power loss represents power loss resistance on the roller, flywheel and other mechanical components and is preset as a function of speed forming a part of torque absorption in the dynamometers 14F and 14R. On the other hand, the traveling resistance indicative data RL serves as braking command. Therefore, in practical control, the front and rear mechanical power loss indicative data MLF and MLR are added to the output of the load cells 20F and 20R to be used as a feedback signal for the dynamometer control system. In the alternative, it is also possible to subtract the front and rear mechanical power loss indicative data MLF and MLR from the traveling resistance indicative data RL for forming braking commands for the dynamometers 14F and 14R.

The average vehicle speed indicative data Vm is also fed to an average acceleration calculation circuit (AAC) 32. The average acceleration calculation circuit 32 differentiates the average vehicle speed indicative data Vm and whereby derives an average acceleration indicative data α.

It should be noted that though the shown embodiment derives the average acceleration data based on the average vehicle speed indicative data Vm, it is also possible to initially derive the front wheel acceleration data by differentiating the front roller speed indicative data VF and the rear acceleration data by differentiating the rear roller speed indicative data VR. Both of the front and rear wheel acceleration data may then be added and divided by 2 to derive the average vehicle speed indicative data α.

The average acceleration data α is then fed to an acceleration resistance deriving circuit (ARD) 34. The acceleration resistance deriving circuit 34 multiplies the average acceleration indicative data α with an equivalent inertia M, a preset value equivalent to the mass of the vehicle body, for example, as a vehicular testing condition indicative parameter, and which is set by an equivalent inertia setting circuit (EIS) 36 to derive an acceleration resistance indicative data Ms. The acceleration resistance indicative data Ms is fed to a braking force torque distribution deriving circuit (BFDD) 38. For the driving torque distribution deriving circuit 38 also receives the traveling resistance indicative data RL from the traveling resistance setting circuit 28. Therefore, essentially the same parameters as that used in the foregoing equation (1) can be obtained at the driving torque distribution deriving means 38.

Here, assuming that the mechanical inertia of the front and rear wheels of the four wheel drive vehicle are respectively MMF and MMR, the electric inertia ME can be expressed by:

$$ME = M - (MMF - MMR) \quad (2)$$

In the alternative, the electric inertia resistance command value which can be derived from the following equation:

$$\text{command value} = [ME - (MMF + MFR)]\alpha \quad (3)$$

The braking force distribution deriving circuit 38 is also connected to a steady state braking force distribution setting switch 40 and an acceleration proportional braking force setting switch 42. The braking force distribution setting switch 40 provides a constant K1 according to set braking force distribution. Also, the acceleration proportional braking force setting switch 42 provides a constant K2 representative of the braking force distribution depending upon acceleration. The braking force distribution deriving circuit 38 may operate in the following three ways:

a) deriving a steady state distribution ratio;
b) deriving the steady state distribution ratio and a variation of the distribution ratio proportional to acceleration; and
c) deriving the steady state distribution ratio, a variation of the distribution ratio proportional to overall braking force, and the variation of the distribution ratio proportional to the acceleration.

Among the aforementioned three ways, a) derives the braking force distribution by monitoring the load distribution between the front and rear wheels or a driving torque distribution during a steady state condition. In this case, because the four wheel drive vehicle can have driving torque distribution which is much different from the load distribution between the front and rear wheels, response characteristics and precision control is required when speed difference control for differentiating and synchronizing the rotation speed of the front and rear rollers; b) concerns only acceleration resistance and ignores variation of braking force distribution during steady state. At a low speed range, the traveling resistance is relatively small and variation of braking force distribution is not significant. Therefore, by introducing variation of the braking force distribution depending upon acceleration, response characteristics in speed difference control for the front and rear rollers can be improved. However, when vehicular driving torque distribution is to be simulated, the detected torque distribution can be differentiated from that on an actual road. Especially, at relatively high speed range, i.e. over 100 km/h, the steady state traveling resistance becomes substantial to cause an unacceptably large difference between the simulated driving torque distribution and actual road conditions. In case of c), most desirable and precise results can be obtained, particularly in testing driving torque distribution. On the other hand, however, method c) requires a larger number of characteristic setting means making the circuit of the control system more complicated.

Figure 3:
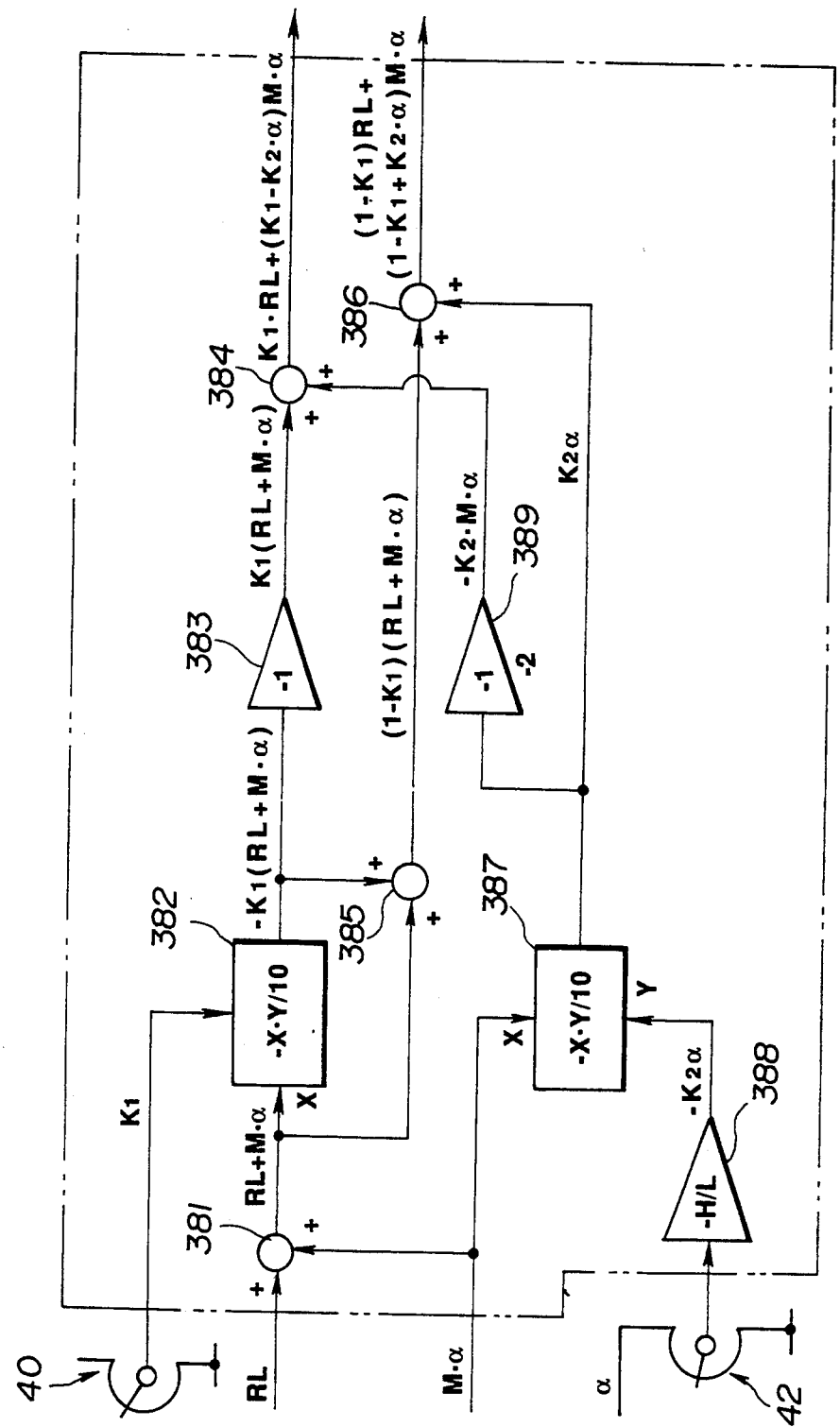
FIG. 3 is a block diagram of a braking force distribution calculating circuit employed in the preferred embodiment of the chassis dynamometer control system of FIG. 2.

FIG. 3 shows the preferred constructions of the braking force distribution deriving circuit 38 employed in the preferred embodiment of the chassis dynamometer control system of FIG. 2. As seen, the traveling resistance indicative data RL and the acceleration resistance indicative data M$\alpha$ are supplied to an adder 381. The adder 381 thus derives a sum value (RL+M$\alpha$) of the traveling resistance indicative data RL and the acceleration resistance indicative data M$\alpha$ and outputs the sum value to a multiplier 382 to which the set inertia representative constant K1 is supplied. The multiplier 382 is so designed to perform calculation to output $-(x \cdot y)/10$ in response to input at an input terminal x to which the sum value (RL+M$\alpha$) is supplied and input terminal y to which the set inertia representative constant K1 is supplied. The output $(-K1(RL+M\alpha))$ of the multiplier 382 is then supplied to an inverting amplifier 383. The inverting amplifier 383 inverts the input from the multiplier 282 and supplies the inverted value to an adder 384.

On the other hand, the sum value (RL+M$\alpha$) of the adder 381 is also supplied to an adder 385, to which the output of the multiplier 382 is also supplied. The adder 385 sums these inputs to supply the sum value $(1-K1)(RL+M\alpha)$ to another adder 386.

The acceleration resistance indicative data M$\alpha$ is also input to another multiplier 387 which performs the identical function to that performed by the multiplier 382. The acceleration indicative data M$\alpha$ is supplied to the x input terminal of the multiplier 387. To the y input terminal of the multiplier, the acceleration dependent constant value $-K2\alpha$ is supplied from the acceleration proportional braking force setting switch 42 via a gain amplifier 388. The gain amplifier 388 is set at a gain H/L (wherein H is road clearance of the vehicular body and L is wheel base of the vehicle). The output of the multiplier 387 is supplied to the adder 384 via an inverter 389. In turn, the output of the multiplier 387 is directly supplied to the adder 386.

Returning to FIG. 2, the front and rear roller speed representative data VF and VR are supplied to a speed difference control circuit (SDC) 44. The speed difference control circuit 44 also receives a speed difference setting command from a speed difference setting switch 46. the speed difference control circuit 44 is per se known in the prior art and utilized to selectively equalize the speed of the front and rear rollers or, in the alternative to, adjust a speed difference between the front and rear wheel ($\Delta V = VF - VR$) to a predetermined value corresponding to a commanded value input from the speed difference setting switch 46. One embodiment of the speed difference control circuit 44 is illustrated in FIG. 4.

Figure 4:
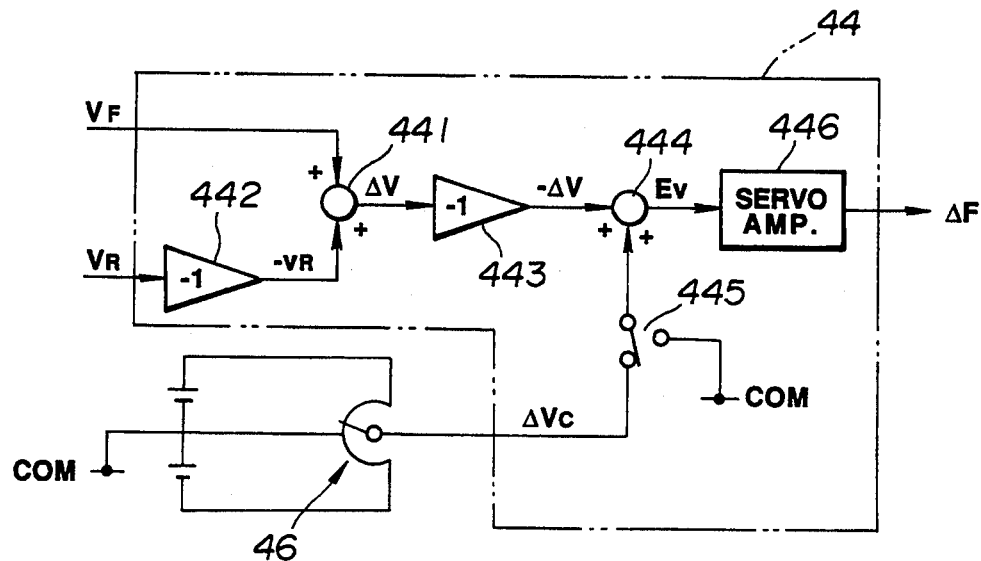
FIG. 4 is a block diagram of a roller speed control circuit employed in the preferred embodiment of the chassis dynamometer control system of FIG. 2.

In FIG. 4, the front roller speed indicative data VF, representative of the speed of the front rollers 10FL and 10FR is supplied to an adder 441. One the other hand, the rear roller speed indicative data VR representative of the speed of the rear rollers 10RL and 10RR is supplied to the adder 441 via an inverter 442. Therefore, the adder 441 outputs a roller speed difference indicative data $\Delta V$. The roller speed difference indicative data $\Delta V$ is supplied to an adder 444 via an inverter 443. The adder 444 also receives the speed difference setting command $\Delta Vc$ from the speed difference setting switch 46 via an equalization and differentiation switch 445. The adder 444 then derives an error signal Ev representative of a difference between the speed difference indicative data $\Delta V$ and the speed difference setting command ΔVc. The error signal Ev is fed to a servo amplifier 446. The servo amplifier 446 derives a braking force correction data ΔF for adjusting the difference in speeds of the front and rear rollers toward the value of the speed difference setting command ΔVc.

When equal peripheral speeds of the front and rear rollers are desired, the equalization and differentiation switch 445 is switched from the shown position to the position connected to the other terminal. Then the input to the adder 444 from the switch 445 becomes zero. Therefore, the error signal value Ev becomes equal to the speed difference indicative data ΔV. The braking force correction data ΔF thus generated serves for equalizing the speeds of the front and rear rollers.

It should be appreciated that the speed difference control circuit 44 is often composed of a digital circuit to perform functions discussed in terms of an analog circuit hereabove, and may be accomplished by software executed within the digital circuit system. Such control performed by the digital circuit is typically called synchronization control. Also, it is possible to additionally employ roller phase detectors for the respective front and rear rollers, and perform roller phase control for synchronizing the rotational phases of the front and rear rollers.

The braking force correction data ΔF thus output from the speed difference control circuit 44 is fed to an adder 48 via an inverting amplifier 50 and a mode switch 52 which is designed to be turned ON when relative roller speed control, i.e. equalization or adjustment to a desired peripheral speed difference, is to be performed. On the other hand, the braking force correction data ΔF is also fed to an adder 54 via the mode switch 52. To the adders 54 and 48, a front braking force control data FCF and a rear brake force control data FCR are respectively supplied as output data of the braking force distribution deriving circuit 38. The adder 54 thus sums the braking force correction data ΔF to the front braking force control data FCF to derive a modified front braking force control data FCF'. Similarly, the adder 48 sums the inverted braking force correction data −ΔF as inverted by the inverting amplifier 50, and the rear braking force control data FCR for deriving a modified rear braking force control data FCR'.

The modified front braking force control data FCF' is then fed from the adder 54 to a front chassis dynamometer control device (FCDC) 56. To the front chassis dynamometer control device 56, a front mechanical inertia dependent acceleration deriving circuit (FMIDAD) 58 is connected. The front mechanical inertia dependent acceleration deriving circuit 58 is connected to a front roller acceleration deriving circuit (FRAD) 60 which derives front roller acceleration data αF based on the front roller speed indicative data VF. In practice, the front roller acceleration deriving circuit 60 differentiates the front roller speed indicative data VF to derive the front roller acceleration data αF. Similarly, the modified rear braking force control data FCR' is then fed from the adder 48 to a rear chassis dynamometer control device (RCDC) 62. To the rear chassis dynamometer control device 62, a rear mechanical inertia dependent acceleration deriving circuit (RMIDAD) 64 is connected. The rear mechanical inertia dependent acceleration deriving circuit 64 is, in turn, connected to a rear roller acceleration deriving circuit (RRAD) 66 which derives rear roller acceleration data αR based on the rear roller speed indicative data VR. In practice, the rear roller acceleration deriving circuit 66 differentiates the rear roller speed indicative data VR to derive the rear roller acceleration data αR.

Each of the front and rear mechanical inertia dependent acceleration deriving circuits 58 and 64 derives acceleration exerted on the mechanical equivalent inertia values MMF or MMR of the rotary components, such as rollers, dynamometer, flywheel and so forth. When the chassis dynamometers are of the full electric inertia control type, the mechanical equivalent inertia values MMF and MMR will become a fixed value. However, in case that the chassis dynamometer is provided with a flywheel disconnectable with the chassis dynamometer by means of a clutch, the mechanical equivalent inertia may be differentiated by connecting and disconnecting the clutch. Therefore, in such case, the values of the mechanical equivalent inertia values MMF and MMR may be switched between predetermined values by detecting an operational state of the clutch. It should be noted that the signals representative of connected and disconnected states of the clutch may also be utilized in the front and rear chassis dynamometer control devices 56 and 62.

Figure 5:
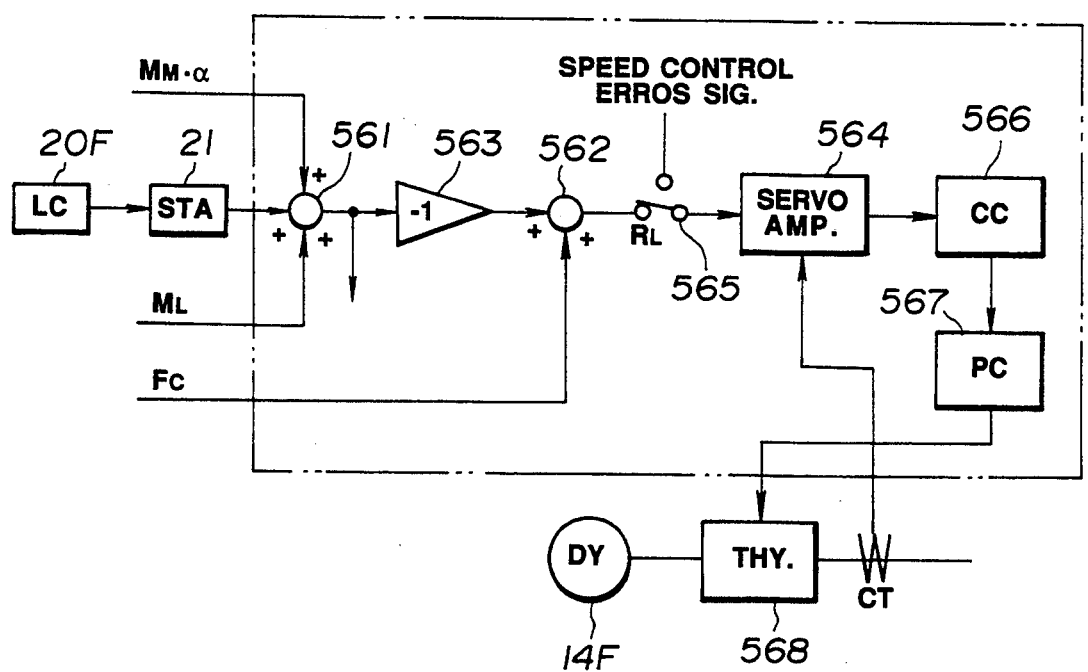
FIG. 5 is a block diagram of a dynamometer control circuit employed in the preferred embodiment of the chassis dynamometer control system of FIG. 2.

The front and rear chassis dynamometer control devices 56 and 62 have essentially identical construction. Because of the identical constructions between the front and rear chassis dynamometer control devices 56 and 62, only the front chassis dynamometer control device 56 will be discussed herebelow with reference to FIG. 5. As shown in FIG. 5, the front chassis dynamometer control device 56 has an adder 561 to which the front mechanical power loss indicative data MLF is input from the front mechanical power loss setting circuit 30F. Also, the front mechanical inertia dependent acceleration indicative output (MMFα), of the front mechanical inertia dependent acceleration deriving circuit 58, is input to the adder 561. Furthermore, the output of the load cell 20F is input via a signal conditioning circuit 21. The adder 561 thus derives a sum value. The sum value is then fed to an adder 562 via an inverting amplifier 563. The adder 562 also receives the modified front braking force control data FCF' from the adder 54. The adder 562 thus derives a sum value to be fed to a servo amplifier 564 via a switch 565. The sum value derived by the adder 562 represents a difference between the commanded braking force as represented by the modified braking force control data FCF' and the actual braking force represented by the output of the adder 561 as the sum value of the front mechanical power loss indicative data MLF, the front mechanical inertia dependent acceleration indicative value MMFα and the conditioned load cell output. Therefore, the output of the adder 562 serves as an error signal. The servo amplifier 564 performs PID (proportional and integral and derivative) calculation based on the error signal to derive a current control signal. The current control signal is fed to a current control device (CC) 566. The current control device 566 is associated with a thyristor unit (THY) 567 via a phase control device (PC) 568 for cooperating therewith to control the primary power supply for the dynamometer 14F.

With the construction set forth above, since the present invention controls the chassis dynamometer by taking the mechanical inertia exerted on the rotary elements in the system overall, precision level of control and response characteristics can be maintained at satisfactorily high level even when driving torque distribution between the front and rear wheels are far evenly distributed. Furthermore, in the shown system, the accuracy of control and response characteristics will not be degraded even when the set inertia value is close to the mechanical inertia of the chassis dynamometer. Furthermore, by taking mechanical inertia into consideration, error in measurement during acceleration or deceleration transition from the steady state can be minimized. In addition, a control constant in the speed different control circuit need not be frequency adapted for the vehicle to be tested. Furthermore, the chassis dynamometer according to the present invention can perform equivalent speed equalization of front and rear rollers in a manner equivalent to chassis dynamometers which are mechanically and rigidly coupled to each other.

Therefore, the present invention can fulfill all of the objects and advantages sought therefor.

While the present invention has been discussed in detail in terms of the preferred embodiment of the invention, the present invention can be embodied in various fashion. Therefore, it should be appreciated that the invention includes all possible embodiments and modification thereof which can be embodied without depart from the principle of the invention, which is defined in the appended claims.

For instance, though the foregoing embodiment employs the direct current type dynamometer, it can be easily replaced with an alternating current type dynamometer. In such case, the current control device, the phase control device and the thyristor may be replaced with a power regeneration type inverter and a current control device for the inverter. Also, the braking force may be electrically or arithmetically derived based on the voltage, current or velocity of the primary circuit, in place of the load cell. In such case, the load cell is replaced with an electric arithmetic circuit. Furthermore, if desired, the load cell can also be replaced with an axial torque meter.

In addition, in the foregoing embodiment, the pair of front rollers and the pair of rear rollers are coupled rigidly by means of common rotary shaft. However, by providing four mutually independent chassis dynamometers, all rollers can be made independent of each other.

What is claimed is:

1. A control system for a chassis dynamometer for carrying out in place testing of vehicular performance, comprising:
    at least first and second rollers rotatably coupled with first and second vehicular wheels oriented at axially different positions on a vehicular body, said rollers being driven by driving torque transmitted from said vehicular wheels;
    at least first and second dynamometers respectively coupled with said first and second rollers driven by driving torque transmitted through an associated one of said first and second rollers;
    first monitoring means for monitoring speed and torque output associated with said first roller, for providing first chassis dynamometer control data;
    second monitoring means for monitoring speed and torque output associated with said second roller, for providing second chassis dynamometer control data;
    third monitoring means for monitoring inertia of rotary components in a system associated with said first dynamometer including said first dynamometer per se, for providing third chassis dynamometer control data;
    fourth monitoring means for monitoring inertia of rotary components in a system associated with said second dynamometer including said second dynamometer per se, for providing fourth chassis dynamometer control data;
    speed difference setting means receivable of a speed difference signal and active to output first and second correction values;
    control signal generating means for receiving said first and third chassis dynamometer control data and said first correction value for deriving a first dynamometer control signal for generating a control signal to said first dynamometer providing a rolling resistance to said vehicular wheels at said first roller simulating a predetermined vehicular driving condition, and for receiving said second and fourth chassis dynamometer control data and said second correction value for deriving a second dynamometer control signal for generating a control signal to said second dynamometer providing a rolling resistance to said vehicular wheels at said second roller simulating a predetermined vehicular driving condition; and
    switch means operable in a first mode in which speeds of said first and second dynamometers are controlled independently according to said first and second correction values from said speed difference setting means and a second mode in which speeds of said first and second dynamometers are synchronized.

2. A chassis dynamometer control system as set forth in claim 1, wherein each of said first and second monitoring means monitors peripheral speed of an associated one of said first and second rollers and said driving torque exerted on an associated one of said first and second dynamometers.

3. A chassis dynamometer control system as set forth in claim 2, which further comprises a first roller acceleration deriving means receiving said speed data of said first roller for deriving acceleration on said first roller on the basis thereof to produce first roller acceleration indicative data, said third monitoring means deriving said third chassis dynamometer control data based on a preset value representative of a sum value of an inertial force of said rotary components associated with said first dynamometer and said first roller acceleration indicative data; and a second roller acceleration deriving means receiving said speed data of said second roller for deriving acceleration on said second roller on the basis thereof to produce second roller acceleration indicative data, said fourth monitoring means deriving said third chassis dynamometer control data based on a preset value representative of a sum value of an inertial force of said rotary components associated with said second dynamometer and said second roller acceleration indicative data.

4. A chassis dynamometer control system as set forth in claim 3, wherein said preset value of each of said third and fourth monitoring means is variable depending upon a desired driving condition to be simulated by an associated one of said first and second dynamometers.

5. A chassis dynamometer control system as set forth in claim 4, which further comprises coupling means disposed between said first and second rollers for coupling and decoupling said first and second rollers, each of said third and fourth monitoring means varying said preset value depending upon an operational position of said coupling means.

6. A chassis dynamometer control system as set forth in claim 4, which further comprises a speed difference setting means for setting a desired speed difference between said first and second rollers so that said control signal generating means generates said first and second chassis dynamometer control signals for achieving the set speed difference between said first and second rollers.

7. A chassis dynamometer control system as set forth in claim 6, wherein said speed difference setting means receives said speed data of said first and second rollers from said first and second monitoring means and derives a correction value based on a difference in the speeds of said first and second rollers and said desired speed difference and, said control signal generating means modifies said first and second chassis dynamometer control signals with said correction value for achieving said desired speed difference.

* * * * *